S. S. BURR.
Folding Bedstead.
No. 9,393. Reissued Sept 28, 1880.
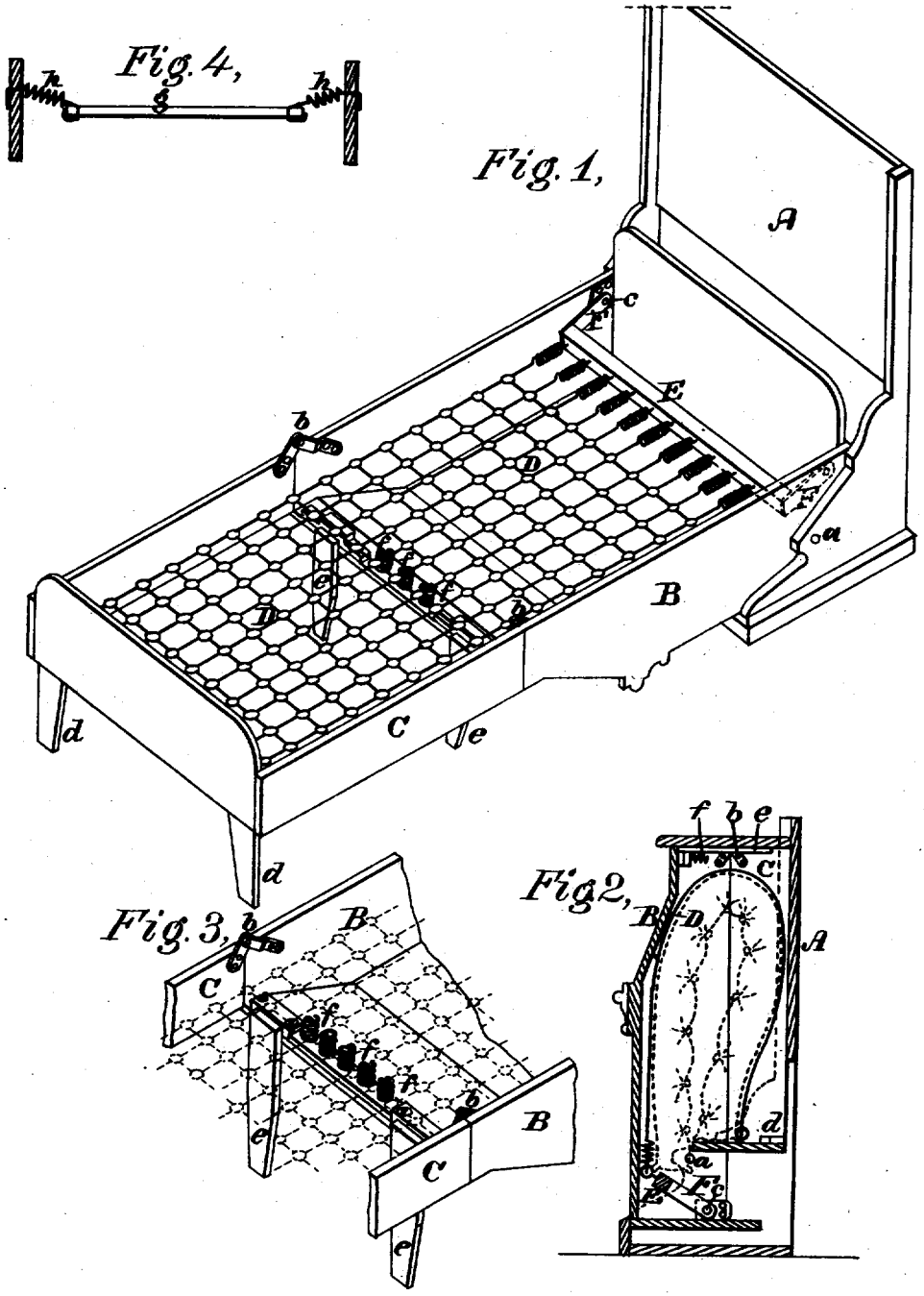
Witnesses:
Geo. W. Gill
Saml. Warthong.
Inventor:
Sanford S. Burr,
by A. S. Burley
his Atty.
N. PETERS, PHOTO-LITHOGRAPHER, WASHINGTON, D. C.

UNITED STATES PATENT OFFICE.

SANFORD S. BURR, OF CHICAGO, ILLINOIS.

FOLDING BEDSTEAD.

SPECIFICATION forming part of Reissued Letters Patent No. 9,393, dated September 28, 1880.

Original No. 222,379, dated December 9, 1879. Application for reissue filed August 4, 1880.

*To all whom it may concern:*

Be it known that I, SANFORD S. BURR, of Chicago, Cook county, in the State of Illinois, have invented certain new and useful Improvements in Folding Bedsteads, of which the following is a specification.

My invention relates to folding bedsteads of the kind described in my Letters Patent No. 179,513, dated July 4, 1876, subsequently reissued, No. 7,892, September 18, 1877, and No. 191,651, dated June 5, 1877—that is to say, a bedstead in which the folding-bed frame is combined with a flexible bed-bottom attached to the frame by its ends only, and under tension only when the frame is unfolded.

My improvement consists in attaching the bed-bottom at one of its ends not directly to the bed-frame, but to a cross-bar or frame hinged or pivoted to the bed-frame, so that the bar may move in the arc of a circle of which the pivots are the center and the arms the radius. I am enabled in this way to bring the points of attachment of the bed-bottom at this end nearer to the top of the side rails, since when the bed is folded the cross-bar will drop to the bottom or under side of the bed, and by thus raising this point of attachment I am enabled to bring the line of tension of the bed-bottom much nearer to a line passing through the pivot or axis of the hinge that unites the two sections of the bed-frame, thus requiring but a slight tilting of the sections to bring the joint or hinge to a position where the outer section may be easily lifted and folded over onto the inner section.

My invention further consists in combining with the bed-bottom and the folding-bed frame a yielding or spring support, which extends transversely of the bed-frame and serves to uphold the bed-bottom, with a view to prevent it from sagging. This support is so placed that it does not interfere at all with the bed-bottom or bedding when the bedstead is folded up, and yet acts as a material support to the bed-bottom or bedding when the bed is unfolded. It has the further advantage that it permits me to use a less expensive top covering—such, for instance, as canvas. This portion of my invention can be used independently of the hinged or pivoted cross-bar improvement hereinbefore referred to.

In the accompanying drawings, Figure 1 is a perspective view of an unfolded folding bedstead embodying my improvement. Fig. 2 is a transverse vertical section of the same folded up, with the mattress indicated by dotted lines. Fig. 3 is a view of the central portion of the bed-frame, with the bed-bottom indicated by dotted lines, in order to illustrate more clearly the arrangement of the elastic central support. Fig. 4 is a view of an elastic and yielding support which may be substituted for that shown in Fig. 3.

The case is shown at A, and the two sections of the bed-frame at B C, the inner section, B, pivoted to the case at *a*, and the two sections hinged together at *b*. The parts named are shown and described in my Letters Patent before recited, and require no further description here.

With the bed-frame is combined a flexible bed-bottom, D, suspended from the frame by its ends only, and under tension only when the frame is unfolded, as also described in my aforesaid Letters Patent. At one end it is secured to the outer section, C, in any ordinary or suitable manner. At the other end, instead of being attached directly to the end of the inner section, B, it is fastened to a cross-bar, E, carried by connecting-arms F, hung on pivots *c* in the side rails of section B. The cross-bar, when the bed-frame is extended and the bed-bottom is under tension, occupies the position shown in Fig. 1; and when the bedstead is folded up the cross-bar occupies the position shown in Fig. 2, where it is quite out of the way, and does not interfere with other parts of the bedstead or with the mattress or bedding.

The advantages of the arrangement have before been stated and need not be repeated.

The outer portions of the bed-frame section are supported, when unfolded, by means of legs *d d e e*, which may be detachable or arranged in any suitable way to turn or fold up out of the way when the bedstead is folded.

On the outer end of the inner bed-frame section, B, I place the hereinbefore-referred-to elastic support, which in this instance consists of a row of spiral springs, *f*, extending transversely of the bed-bottom.

To avoid rendering the drawings obscure I have represented but a few springs in Fig. 1. It will be understood, however, that the springs extend from side to side of the bed-frame and in such proximity to one another as circumstances may require. It will be seen that they afford an effective support for the bed-bottom when the bed is unfolded, while they are out of the way of and do not interfere with the bed-bottom or bedding when the bed is folded up. If desired, two or more springs need only be employed, a transverse slat or light bar being placed above and upheld by them to act as the support, or, in lieu of that arrangement, I can employ other forms of yielding support—such, for instance, as the cross-bar *g*, (shown in Fig. 4,) to be suspended transverely in proper position between the side rails by means of springs *h*, which would be fastened to the side rails.

In a folding bedstead of the kind to which this improvement relates—that is to say, a bedstead in which the folding-bed frame is combined with a flexible bed-bottom attached to the frame by its ends only, and under tension only when the bed-frame is unfolded—it is practically impossible to subject the bed-bottom to the tension to which it usually is subjected in ordinary non-folding bedsteads. When subjected to this degree of tension it is difficult to manipulate a folding-bed frame. For instance, in getting the bed ready for use it would be a matter of great difficulty to unfold the outer section, C, for in doing this with a bed-bottom under any great tension the resistance offered by the bottom would convert the bed-frame into a lever, of which the section C would be one arm, the legs *e* the fulcrum, and the section B the other arm. The effect in attempting to press down the section C would be to raise the section B, and in so doing tilt the case A back forcibly against the wall or other part near which it may happen to be. Again, if this difficulty be overcome, great trouble is experienced in folding up the bed-frame when the bedstead is put out of the way. The tension holds the two sections so tightly end to end that oftentimes the bed-frame, instead of folding up, will be raised bodily into an upright position, like a solid bed-frame or a wardrobe-bedstead, without breaking the joint at *b*; or in case the weight of the bed-frame is sufficient to cause the joint to break this only occurs after the whole frame has been turned bodily up some distance on the pivots *a*, and then the sudden breaking of the joint at *b* causes the inner section to drop with force, not unfrequently breaking the legs *e* or otherwise damaging the bed. In other words, to subject the bed-bottom to the tension to which it is subjected in non-folding-bed frames forms at the point *b* a spring-hinge of such power as to render it a matter of extreme difficulty to either unfold or fold together the bed-frame sections. It is necessary, therefore, in the kind of bed to which my improvement relates, to considerably reduce the tension of the bed-bottom; but when the tension is thus reduced the bed-bottom, when the bed is used, being attached by its ends only to the bed-frame, will sag and have a hammock-like shape at the center, extremely uncomfortable to the occupant, so that extraneous support for the bed-bottom at that point becomes indispensable.

It is with this view that I have combined with the folding-bed frame and the bed-bottom a transverse elastic support carried by the bed-frame and adapted to uphold the bed-bottom at its center or thereabout.

Having described my invention, what I claim, and desire to secure by Letters Patent, is—

1. In a folding bedstead of the kind described, the combination, with the bed-frame sections, of a flexible bed-bottom secured at one of its ends to one of the sections and at its other end to a cross-bar or frame loosely jointed by connecting-arms to the other section, so that it may drop or fall to the under side of the bedstead when the latter is folded, substantially as shown and set forth.

2. The combination, with the sectional folding-bed frame and the flexible bed-bottom attached by its ends only to said frame, of a transverse elastic or yielding support carried by the bed-frame and adapted to uphold the central portion of the extended bed-bottom, substantially as hereinbefore set forth.

3. The combination, with the sectional folding-bed frame and the flexible bed-bottom attached by its ends only to said frame, of the transverse elastic support unattached to the bed-bottom, and entirely free therefrom when the bed is folded, and secured to and carried by one of the sections of said bed-frame, substantially as hereinbefore set forth.

In testimony whereof I have hereunto set my hand this 2d day of August, 1880.

SANFORD S. BURR.

Witnesses:
FREDK. F. DAGGETT,
H. H. GROSS.